Sept. 19, 1967  S. R. OVSHINSKY  3,343,085
OVERVOLTAGE PROTECTION OF A.C. MEASURING DEVICES
Filed Sept. 20, 1966  2 Sheets-Sheet 1
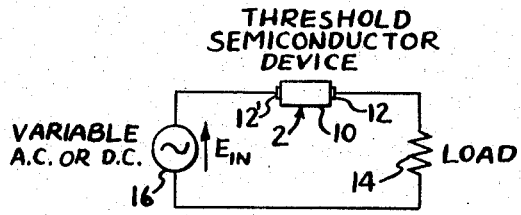
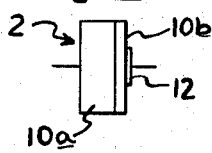 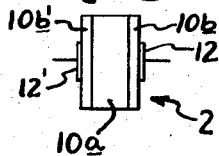 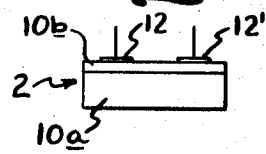
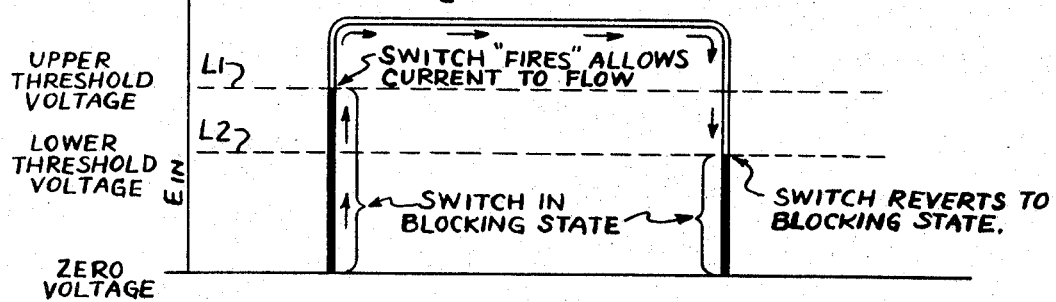
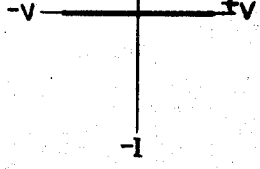 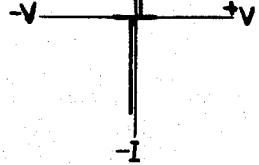
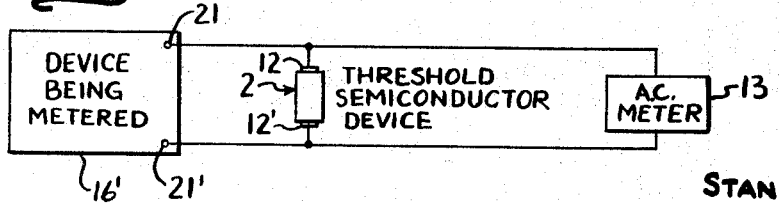
INVENTOR
STANFORD R. OVSHINSKY
by: Wallenstein, Spangenberg
  & Hattis    ATTYS.

United States Patent Office 3,343,085
Patented Sept. 19, 1967

3,343,085
OVERVOLTAGE PROTECTION OF A.C. MEASURING DEVICES
Stanford R. Ovshinsky, Bloomfield Hills, Mich., assignor to Energy Conversion Devices, Inc., Troy, Mich., a corporation of Delaware
Filed Sept. 20, 1966, Ser. No. 598,531
3 Claims. (Cl. 324—110)

This application is a continuation-in-part of copending application Ser. No. 358,829, filed Apr. 10, 1964, now abandoned which in turn is a continuation-in-part of copending applications Ser. No. 118,642, filed June 21, 1961 and abandoned; Ser. No. 226,843, filed Sept. 28, 1962 and forfeited; Ser. No. 252,510, filed Jan. 18, 1963, now abandoned; Ser. No. 252,511, filed Jan. 18, 1963 and forfeited; Ser. No. 252,467, filed Jan. 18, 1963, now abandoned; Ser. No. 288,241, filed June 17, 1963 and abandoned; and Ser. No. 310,407, filed Sept. 20, 1963 and now U.S. Patent No. 3,271,591.

This invention relates to the protection of measuring devices from excessive A.C. voltages.

One of the objects of the present invention is to provide a very inexpensive and reliable means for protecting A.C. measuring devices from excessive A.C. voltages which may damage the measuring device. A related object of the invention is to provide a means for protecting A.C. measuring devices against excessive voltages at various frequencies and voltage levels and, most especially, at low frequencies and moderate voltages (e.g. 130–150 volts) as required, for example, for the protection of A.C. meters used in 110 volts, 60 cycles per second commercial power systems. A further related object of the invention is to provide excessive voltage protecting means as described which automatically resets itself after the excessive voltage disappears.

The present invention deals with a very recently developed bi-directional semiconductor device which is extremely simple and inexpensive to manufacture and which presents a very high resistance under normal voltage conditions, a very low resistance when a voltage above a given threshold level is applied thereto, the change from the high to the low resistance condition occuring substantially instantaneously, and automatically resets itself when the voltage in the circuit involved returns to a normal level. This device has the further important advantage that it can be made to operate in 110 volts 60 cycle commercial power voltage system (as well as other systems requiring protection at higher and lower A.C. voltage levels at higher and lower frequencies.

In the short span of years since World War II, semiconductor technology has advanced at a phenomenal pace. Starting with the germanium rectifier and the point contact transistor, research and development laboratories have applied the theory of conduction by junction control to create a whole new family of solid state components (junction diodes and junction transistors, silicon controlled rectifiers and switches, tunnel diodes). Today, these and many other highly sophisticated semiconductor devices are being used in countless applications to accomplish functions at levels of speed, power and reliability undreamed of less than a decade ago.

It is interesting to note, however, that all of these remarkable solid state components are based essentially upon extensions and refinements of basic rectifier principles. That is, they allow current to flow in just one direction—and are therefore inherently suitable for use in direct current applications only. Accordingly, to apply present day semiconductor components to the control of alternating current, it has been necessary to use two identical units "back-to-back" in conjunction with complex circuitry or to resort to more complex rectifying devices such as five layer diodes, which are essentially back-to-back rectifiers in one package having limited application and which are relatively difficult and expensive to manufacture.

In view of these limiting factors, it has long been apparent that an entirely new theoretical concept would be required to extend the full advantages of semiconductors to the far broader field of alternating current control. It has been apparent that any such concept must be predicated upon development of new and symmetrical semiconductor materials which would permit elimination of the rectifying junction and thus allow current to flow in both direction. The bi-directional semiconductor device referred to above is such a new development and is referred herein as a threshold semiconductor device. (Such a device is referred to in said U.S. Patent No. 3,271,591.)

The threshold semiconductor device presents a very high resistance (e.g. one to ten megohms and higher) under normal voltage conditions of any polarity, a very low resistance (about one ohm or less) when a voltage of any polarity above a given upper threshold level is applied thereto, the change from the high to the low resistance condition occurring substantially instantaneously, and automatically resets itself substantially instantaneously to its high resistance state when the voltage drops below a lower threshold level.

In the present invention, a threshold semiconductor device is placed across the terminals of an A.C. measuring device connected into a circuit whose voltage is being measured. The threshold semiconductor device is selected so that it has an upper threshold voltage level in excess of the peak value of the normal expected A.C. voltage in the circuit in which the device is to be used and is below the minimum unsafe voltage level which would damage the measuring device. Also, the lower threshold voltage level of the threshold semiconductor device is selected to be above the normal expected voltage in the circuit. With a threshold semiconductor device having the properties just outlined, the device will be triggered into its conductive state only during the presence of an abnormal voltage, and will automatically return to its nonconductive state when the abnormal voltage disappears, since both the upper and lower threshold voltage levels of the device are respectively above the largest normal voltage to be measured.

For an understanding of the present invention, reference should be made to the specification to follow, the claims, and the drawings wherein:

FIG. 1 is a schematic representation of the threshold semiconductor device described above in a circuit including a load and a source of voltage for controlling the load;

FIGS. 2, 2A and 2B illustrate a few exemplary physical forms of the threshold semiconductor device shown in FIG. 1;

FIG. 3 is a diagram illustrating the operation of the threshold semiconductor device in FIG. 1;

FIGS. 4 and 4A illustrate the voltage-current characteristics for the two operating states of the threshold semiconductor device of FIG. 1 in an A.C. load circuit;

FIG. 5 illustrates the application of threshold device illustrated in FIG. 1 as an A.C. meter overvoltage protection device.

Figure 6:
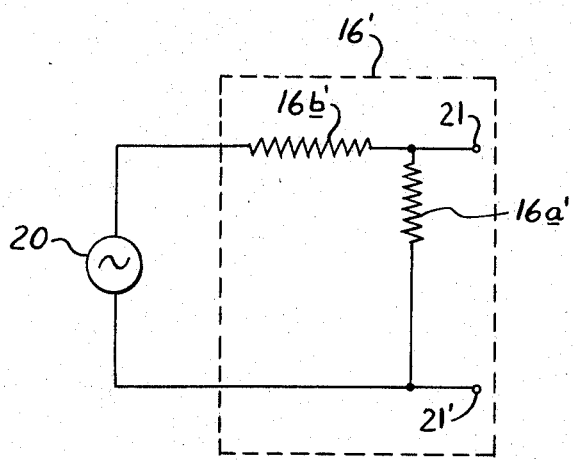
FIG. 6 illustrates an exemplary circuit diagram for the device being metered shown in box form in FIG. 5.

For an understanding of the nature and manner of operation of the threshold semiconductor device, reference is first made to FIGS. 1 to 4A of the drawings. In FIG. 1, which illustrates a typical simple load circuit, the threshold semiconductor device 2 used in the present invention has a body 10 which may take a variety of forms and includes, as a surface film or as the entire body 10 or as a part thereof, an active bi-directional semiconductor material having very unique and advantageous properties to be described. The body 10 includes a pair of electrodes 12–12' electrically connecting the same with a load circuit 14 and a source of voltage 16. In the generalized situation, the source of voltage 16 may be a source of alternating or direct current. (In the present invention, however, the voltage source will constitute a source of A.C. voltage.)

The threshold semiconductor device is symmetrical in its operation and contains non-rectifying active solid state semiconductor materials and electrodes in non-rectifying contact therewith for controlling the current flow therethrough substantially equally in either or both directions. In their high resistance or blocking conditions these materials may be crystalline like materials or, preferably, materials of the polymeric type including polymeric networks and the like having covalent bonding and crosslinking highly resistant to crystallization, which are in a locally organized disordered solid state condition which is generally amorphous (not crystalline) but which may possibly contain relatively small crystals or chains or ring segments which would probably be maintained in randomly oriented position therein by the crosslinking. These polymeric structures may be one, two or three dimensional structures. While many different materials may be utilized, for example, these materials can be tellurides, selenides, sulfides or oxides of substantially any metal, or metalloid, or intermetallic compound, or semiconductor or solid solution or mixtures thereof, particularly good results being obtained where tellurium or selenium are utilized.

It is believed that the cooperating materials (metals, metalloids, intermetallic compounds or semiconductors), which may form compounds, or solid solutions or mixtures with the other materials in the solid state semiconductor materials of this device, operate, or have a strong tendency to operate, to inhibit crystallization in the semiconductor materials, and it is believed that this crystallization inhibiting tendency is particularly pronounced where the percentages of the materials are relatively remote from the stoichiometric and eutectic ratios of the materials, and/or where the materials themselves have strong crystal inhibiting characteristics, such as, for example, arsenic, gallium and the like. As a result, where, as here, the semiconductor materials have strong crystallization inhibiting characteristics, they will remain in or revert to their disordered or generally amorphous state.

The following are specific examples of some of the semiconductor materials which have given satisfactory results in a threshold semiconductor device (the percentages being by weight):

25% arsenic and 75% of a mixture 90% tellurium and 10% germanium; also with the addition of 5% silicon;
75% tellurium and 25% arsenic;
71.8% tellurium, 14.05% arsenic, 13.06% gallium and the remainder lead sulfide;
72.6% tellurium, 17.2% arsenic and 13.2% gallium;
76.6% tellurium, 27.4% gallium arsenide;
85% tellurium, 12% germanium and 3% silicon;
50% tellurium, 50% gallium;
67.2% tellurium, 25.3% gallium arsenide and 7.5% n-type germanium;
75% tellurium and 25% silicon;
75% tellurium and 25% indium antimonide;
55% tellurium and 45% germanium;
45% tellurium and 55% germanium;
75% selenium and 25% arsenic;
50% aluminum telluride and 50% indium telluride; and
50% aluminum telluride and 50% gallium telluride.

In forming the solid state semiconductor materials, the materials may be ground in an unglazed porcelain mortar to an even powder consistency and thoroughly mixed. They then may be heated in a sealed quartz tube to above the melting point of the material which has the highest melting point. The molten materials may be cooled in the tube and then broken or cut into pieces, with the pieces ground to proper shape to form the bodies 10, or the molten materials may be cast from the tube into preheated graphite molds to form the bodies. The initial grinding of the materials may be done in the presence of air or in the absence of air, the former being preferable where considerable oxides are desired in the ultimate bodies 10. Alternatively, in forming the bodies 10, it may be desirable to press the mixed powdered materials under pressures up to at least 1000 p.s.i. until the powdered materials are completely compacted, and then the completely compacted materials may be appropriately heated.

In some instances it has been found, particularly where arsenic is present in the bodies 10 formed in the foregoing manner, that the bodies are in a disordered or generally amorphous solid state, the high resistance or blocking state or condition. In such instances, bare electrodes can be and have been embedded in the bodies during the formation thereof, and can be and have been applied to the surfaces thereof, to provide threshold semiconductor devices of this invention wherein the control of the electric current is accomplished in the bulk of the solid state semiconductor materials.

In other instances, it has been found that the bodies 10 formed in the foregoing manner are in a crystalline like solid state, which may be a low resistance or conducting state or condition, probably due to the slow cooling of the semiconductor materials during the formation of the bodies. In these instances, it is necessary to change to bodies or portions thereof or the surfaces thereof to a disordered or generally amorphous state, and this may be accomplished in various ways, as for example, utilizing impure materials, adding impurities; including oxides in the bulk and/or in the surfaces or interfaces; mechanically by machining, sandblasting, impacting, bending, etching or subjecting to ultrasonic waves; metallurgically forming physical lattice deformations by heat treating and quick quenching or by high energy radiation with alpha, beta or gamma rays; chemically by means of oxygen, nitric or hydrofluoric acid, chlorine, sulphur, carbon, gold, nickle, iron or manganese inclusions, or ionic composition inclusions comprising alkali or alkaline earth metal compositions; electrically by electrical pulsing; or combinations thereof.

Where the entire bodies are changed in any of the foregoing manners to their disordered or generally amorphous solid state, bare electrodes may be embedded therein during the formation of the bodies and the current control by such solid state current controlling devices would be in the bulk. Another manner of obtaining current control in the bulk is to embed in the bodies electrodes which, except for their tips, are provided with electrical insulation, such as an oxide of the electrode material. Current pulses are then applied to the electrodes to cause the effective semiconductor material between the uninsulated tips of the electrodes to assume the disordered or generally amorphous solid state.

The control of current by the threshold semiconductor devices of this invention can also be accomplished by surfaces or films of the semiconductor materials, particularly good results being here obtained. Here, the bodies of the semiconductor material, which are in a low resistance crystalline like solid state, may have their surfaces treated in the foregoing manners to provide surfaces or films which are in a disordered or generally amorphous solid state. Electrodes are suitably applied to the surfaces or films of such treated bodies, and since the bulk of the bodies is in the crystalline like solid state and the surfaces or films are in a disorganized or generally amorphous state (high resistance or substantially an insulator), the control of the current between the electrodes is mainly accomplished by the surfaces or films.

Instead of forming the complete body 10, the foregoing solid state semiconductor materials may be coated on a suitable smooth substrate, which may be a conductor or an insulator as by vacuum deposition or the like, to provide surfaces or films of the semiconductor material on the substrate which surfaces or films are in a disordered or generally amorphous solid state (high resistance or substantially an insulator). The solid state semiconductor materials normally assume this state probably because of rapid cooling of the materials as they are deposited or they may be readily made to assume such state in the manners described above. Electrodes are suitably applied to the surfaces or films on the substrate and the control of the current is accomplished by the surfaces or films. If the substrate is a conductor, the control of the current is through the surfaces or films between the electrodes and the substrate, and, if desired, the substrate itself may form an electrode. If the substrate is an insulator, the control of the current is along the surfaces or films between the electrodes. A particularly satisfactory device which is extremely accurate and repeatable in production has been produced by vapor depositing on a smooth substrate a thin film or tellurium, arsenic and germanium and by applying tungsten electrodes to the deposited film. The film may be formed by depositing these materials at the same time to provide a uniform and fixed film, or the film may be formed by depositing in sequence layers of tellurium, arsenic, germanium, arsenic and tellurium, and in the latter case, the depositioned layers are then heated to a temperature below the sublimation point of the arsenic to unify and fix the film. The thickness of the surfaces or films, whether formed on the bodies by suitable treatment thereof or by deposition on substrates may be in a range up to a thickness of a few ten thousandths of an inch or even up to a thickness of a few hundredths of an inch or more.

The electrodes which are utilized in the threshold semiconductor devices used in this invention may be substantially any good electrical conductor, preferably high melting point materials, such as tantalum, graphite, tungsten, niobium and molybdenum. These electrodes are usually relatively inert with respect to the various aforementioned semiconductor materials.

The electrodes when not embedded in the bodies 10 in the instances discussed above, may be applied to the surfaces or films of bodies, or to the surfaces or films deposited on the substrates in any desired manner, as by mechanically pressing them in place, by fusing them in place, by soldering them in place, by vapor deposition or the like. Preferably, after the electrodes are applied, a pulse of voltage and current is applied to devices for conditioning and fixing the electrical contact between the electrodes and the semiconductor materials. The current controlling devices may be encapsulated if desired.

It is believed that the generally amorphous polymeric like semiconductor materials have substantial current carrier restraining centers and a relatively large energy gap, that they have a relatively small mean free path for the current carriers, large spacial potential fluctuations and relatively few free current carriers due to the amorphous structure and the current carrier restraining centers therein for providing the high resistance or blocking state or condition. It is also believed that the crystalline like materials in their high resistance or blocking state or condition have substantial current carrier restraining centers, and have a relatively large mean free path for the currrent carriers due to the crystal lattice structure and hence a relatively high current carrier mobility but that there are relatively few free curent caies due to the substantial current carrier restraining centers therein, a relatively large energy gap therein, and large spatial potential fluctuations therein for providing the high resistance or blocking state or condition. It is further believed that the amorphous type semiconductor materials may have a higher resistance at the ordinary and usual temperatures of use, a greater non-linear negative temperature-resistance coefficient, a lower heat conductivity coefficient, and a greater change in electrical conductivity between the blocking state or condition and the conducting state or condition than that crystalline type of semiconductor materials, and thus be more suitable for many applications of this invention. By appropriate selection of materials and dimensions, the high resistance values may be predetermined and they may be made to run into millions of ohms, if desired.

As an electrical field is applied to the semiconductor materials (either the crystalline type or the amorphous type) of a device of this invention in its blocking state or condition, such as a voltage applied to the electrodes, the resistance of at least portions or paths of the semiconductor material between the electrodes decreases gradually and slowly as the applied field increases until such time as the applied field or voltage increases to a threshold value, whereupon said at least portions of the semiconductor material, at least one path between the electrodes, are substantially instantaneously changed to a low resistance or conducting state or condition for conducting current therethrough. It is believed that the applied threshold field or voltage causes firing or breakdown or "switching" of said at least portions or paths of the semiconductor material, and that the breakdown may be electrical or thermal or a combination of both, the electrical breakdown caused by the electrical field or voltage being more pronounced where the distance between the electrodes is small, as small as a fraction of a micron or so, and the thermal breakdown caused by the electrical field or voltage being more pronounced for greater distances between the electrodes. For some crystalline like materials the distances between the electrodes can be so small that barrier rectification and p-n junction operation are impossible due to the distances being beneath the transition length or barrier height. The "switching" time for switching from the blocking state to the conducting state are extremely short, less than a few microseconds.

The electrical breakdown may be due to rapid release, multiplication and conduction of current carriers in avalanche fashion under the influence of the applied electrical field or voltage, which may result from external field emission, internal field emission, impact or collision ionization from current carrier restraining centers (traps, recombination centers or the like), impact or collision ionization from valence bands, much like that occurring at breakdown in a gaseous discharge tube, or by lowering the height or decreasing the width of possible potential barriers and tunneling or the like may also be possible. It is believed that the local organization of the atoms and their spatial relationship in the crystal lattices in the crystalline type materials and the local organization and the spatial relationship between the atoms or small crystals or chain or ring segments in the amorphous type materials, at breakdown, are such as to provide at least a minimum mean free path for the current carriers released by the electrical field or voltage which is sufficient to allow adequate acceleration of the free current carriers by the applied electrical field or voltage to provide the impact or collision ionization and electrical breakdown. It is also believed that such a minimum mean free path for the current carriers may be inherently present in the amorphous structure and that the current conducting condition is greatly dependent upon the local organization for both the amorphous and crystalline conditions. As expressed above a relatively large mean free path for the current carriers can be present in the crystalline structure.

The thermal breakdown may be due to Joule heating of said at least portions or paths of the semiconductor material by the applied electrical field or voltage, the semiconductor material having a substantial non-linear negative temperature-resistance coefficient and a minimal heat conductivity coefficient, and the resistance of said at least portions or paths of the semiconductor material rapidly decreasing upon such heating thereof. In this respect, it is believed that such decrease in resistance increases the current and rapidly heats by Joule heating said at least portions or paths of the semiconductor material to thermally release the current carriers to be accelerated in the mean free path by the applied electrical field or voltage to provide for rapid release, multiplication and conduction of current carriers in avalanche fashion and, hence, breakdown, and, especially in the amorphous condition, the overlapping of orbitals by virtue of the type of local organization can create different sub-bands in the band structure.

It is also believed that the current so initiated between the electrodes at breakdown (electrically, thermally or both) causes at least portions or paths of the semiconductor material between the electrodes to be substantially instantaneously heated by Joule heat, that at such increased temperatures and under the influence of the electrical field or voltage, further current carriers are released, multiplied and conducted in avalanche fashion to provide high current density, and a low resistance or conducting state or condition which remains at a greatly reduced applied voltage. It is possible that the increase in mobility of the current carriers at higher temperature and higher electric field strength is due to the fact that the current carriers being excited to higher energy states populate bands of lower effective mass and, hence, higher mobility than at lower temperatures and electric field strengths. The possibility for tunneling increased with lower effective mass and higher mobility. It is also possible that a space charge can be established due to the possibility of the current carriers having different masses and mobilities and since an inhomogeneous electric field could be established which would continuously elevate current carriers from one mobility to another in a regenerative fashion. As the current densities of the devices decrease, the current carrier mobilities decrease and, therefore, their capture possibilities increase. In the conducting state or condition the current carriers would be more energetic than their surroundings and would be considered as being hot. It is not clear at what point the minority carriers present could have an influence on the conducting process, but there is a possibility that they may enter and dominate, i.e. become majority carriers at certain critical levels.

It is a further believed that the amount of increase in the mean free path for the current carriers in the amorphous like semiconductor material and the increased current carrier mobility are dependent upon the amount of increase in temperature and field strength, and it is possible that said at least portions or paths of some of the amorphous like semiconductor materials are electrically activated and heated to at least a critical transition temperature, such as a glass transition temperature, where softening begins to take place. Thus, due to such increase in mean free path for the current carriers, the current carriers produced and released by the applied electrical field or voltage are rapidly released, multiplied and conducted in avalanche fashion under the influence of the applied electrical field or voltage to provide and maintain a low resistance or conducting state or condition.

The voltage across the device in its low resistance or conducting state or condition remain substantially constant although the current may increase and decrease greatly. In this connection, it is believed that the conducting filaments or threads or paths between the electrodes increase and decrease in cross section as the current increases and decreases for providing the substantially constant voltage condition while conducting. When the current through said at least portions or paths of the semiconductor material decreases to a minimum current holding value which is near zero, it is believed that there is insufficient current to maintain the same in their low resistance or conducting state or condition, whereupon they substantially instantaneously change or revert to their high resistance or blocking state or condition. In other words, the conducting filaments or threads or paths between the electrodes are interrupted when this condition occurs. The decrease in current below the minimum current holding value may be brought about by decreasing the applied voltage to a low value. Said at least portions or paths of the semiconductor material may again be substantially instantaneously changed to their low resistance or conducting state or condition when they are again activated by the voltage applied thereto. The ratio of the blocking resistance to the resistance in the conducting state or condition is extremly high, as for example, larger than 100,000:1. In its low resistance or conducting state or condition the resistance may be as low as 1 ohm or less as determined by the small voltage drop thereacross and the holding current for the device may be near zero.

The voltage-current characteristics of the current controlling device are reversible and are generally independent of the load resistance and independent of whether D.C. or A.C. is used. The manner in which the current controlling device operates in a load circuit powered by an A.C. voltage (FIG. 1) is illustrated by the diagram of FIG. 3 and by the voltage-current curves of FIGS. 4 and 4A. When the device 2 is in its high resistance or blocking state or condition and the peak value of the applied A.C. voltage is less than the upper threshold or breakdown voltage value of the device, the device remains in its high resistance or blocking state or condition as indicated in FIGS. 3 and 4. When the peak value of the A.C. applied voltage is raised to the breakdown or upper threshold voltage level L1 shown in FIG. 3, the device fires and causes said at least portions or paths of the semiconductor material to switch or change to the low resistance or conducting state or condition as indicated in FIGS. 3 and 4A. It is noted that the vertical portions of the curve in FIG. 4A are slightly off-set from the zero voltage center point which curve portions represent the small resistance of the device 2 and the small and substantially constant voltage drop thereacross in its low resistance or conducting state or condition. In this condition there is a constant ratio of voltage change to current change in the device 2, the voltage drop thereacross is a minor fraction of the voltage drop across the active semiconductive material of the device in the blocking condition thereof and the low voltage drop thereacross in the conducting condition of the device is the same for increase and decrease in the instantaneous current above the minimum current holding value. It is also noted in FIG. 4A that the device intermittently assumes its high resistance or blocking state or condition each half cycle of the A.C. voltage as the instantaneous voltage nears zero and drops the current below the minimum current holding value, the current being momentarily interrupted during each half cycle. However, following each momentary half cycle interruption of the current flow, the low resistance state or condition of said at least portions or paths of the semiconductor material resumes the next half cycle when the instantaneous value of the applied voltage reaches a certain lever L2 in FIG. 3 which is at times substantially below the upper threshold voltage level L1, especially where the active semiconductor material has any appreciable thickness where heat dissipation is less than ideal. However, other factors than temperature could also possibly be responsible for the presence of a lower voltage level L2. This lower voltage level is referred to in FIG. 3 as a lower threshold voltage. The semiconductor device is considered to be in its conducting state or condition despite its momentary return to the high resistance state or condition each half cycle. However, when the peak value of the A.C. voltage is decreased below the lower threshold voltage level L2, the low resistance state or condition does not resume each half cycle and the device is then considered to be in a blocking state or condition, this being illustrated in FIGS. 3 and 4. After the device becomes non-conducting, it cannot again become conducting until the peak voltage of the applied A.C. voltage becomes at least as great as the upper threshold voltage value L1 of the device to produce the voltage-current curve of FIG. 4A.

FIGS. 2, 2A and 2B illustrate some exemplary physical forms of the threshold semiconductor device 2. They comprise an inactive and conductive body portion 10a of a metal or the like or an inactive and conducting semiconductor material and one or more active semiconductor layers or films 10b–10b' made in the manner described above. The electrodes 12 and 12' may comprise separate layers of metal or the like as illustrated in the embodiments of FIGS. 2A and 2B or one of the electrodes 12 may be formed by the conductive body portion 10a as illustrated in the embodiment of FIG. 2.

Refer now to FIG. 5 which illustrates the application of the threshold device just now described to an A.C. meter for protecting the same against excessive voltages. A device or circuit 16' has a pair of terminals 21–21' across which a voltage appears to be measured by an A.C. meter or other measuring devices 13. The aforementioned bi-directional threshold semiconductor device 2 is connected across the A.C. meter 13 to protect the same against excessive meter damaging voltages. The upper threshold level of the threshold semiconductor device 2 is above the peak voltage value of the normal expected A.C. voltages to be measured by the meter 13 and below the minimum unsafe voltage level of the meter involved. Consequently, if an excessive A.C. voltage should appear across the terminals 21–21' which may damage the meter 13, the semiconductor device 2 will be instantaneously triggered to its highly conductive state or condition where the voltage drop across the meter will be of an insignficant value, such as one volt. The peak values of the normal expected voltages to be measured are below the lower threshold level of the threshold semiconductor device 2. Consequently, when the excessive voltage disappears, the threshold semiconductor device 2 will automatically return to its high resistance state or condition and will remain in such state until an excessive voltage once again appears across the terminals 21–21'. As previously indicated, threshold semiconductor devices can be made with upper and lower threshold levels above 130 volts and higher and operate at frequencies of 60 cycles per second (as well as at frequencies both above and below this level) so that the present invention has an important use as an overvoltage protection device in 110 volts, 60 cycle per second commercial power circuits (as well as other circuits).

Figure 7:
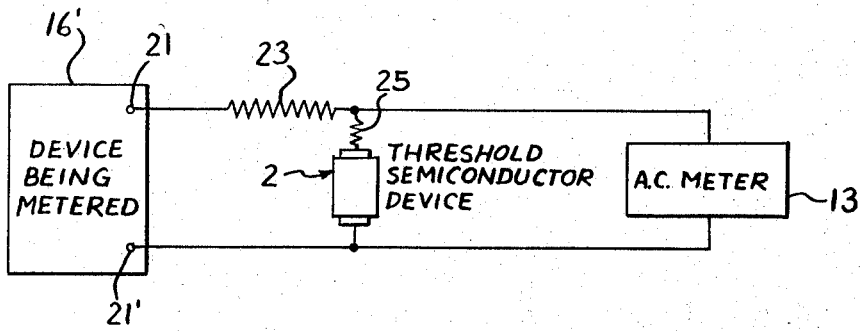
FIG. 7 shows the circuit of FIG. 5 with a series dropping resistor added between the device being metered and the threshold device.

It is, of course, assumed that the circuit 16' includes voltage dropping impedances across which most of the applied voltage appears when the threshold semiconductor device 2 is fired. This is illustrated in FIG. 6 where the circuit 16' being measured includes a resistor 16a' across which the voltage to be measured appears and a series resistor 16b'. A source of applied voltage 20 is connected in series with the resistors 16a' and 16b'. The series resistance 16b' must, of course, be of a value much greater than the conducting resistance of the threshold semiconductor device 2. In the event that the circuit 16' does not have a series resistor 16b' across which most of the applied voltage appears when the threshold semiconductor device 2 conducts, than a resistor 23 is added between one of the terminals 21 or 21' and one of the terminals of the threshold semiconductor device 2 as shown in FIG. 7. The resistor 23 should preferably be an insignificant fraction of the resistance of the A.C. meter 13 to avoid the necessity of recalibrating the A.C. meter. In the event that the impedance of the circuit 16' or the resistor 23 is insufficient to limit the current flow to safe limits, then a current limiting resistor 25 may be added, for example, between the threshold semiconductor device 2 and the resistor 23 where the resistor 25 does not affect the calibration of the meter 13.

Perhaps one of the most important advantages of the invention is the fact that the threshold semiconductor device 2 can be manufactured at a cost which is comparable to or less than conventional fuses which are not reuseable and are not as fast acting as the threshold semiconductor device described above.

It is apparent that the present invention provides an exceedingly simple and effective self-resetting overvoltage protection means.

What is claimed is:

1. In an A.C. circuit including a first pair of terminals across which an A.C. voltage is to be measured, and an A.C. measuring device having a pair of voltage input terminals electrically connected across said first pair of terminals and which is capable of safely handling voltages below a given minimum unsafe voltage level, the improvement comprising overvoltage protection means electrically connected across said voltage input terminals, said overvoltage protection means comprising a bi-directional semiconductor current controlling device including a solid state semiconductor material and electrodes coupling the same across said input terminals, said solid state semiconductor material in one state having at least portions thereof between the electrodes in one condition which is of high resistance and substantially an insulator for blocking the flow of current through the current controlling device therethrough in either or both directions when an applied voltage is below an upper threshold voltage level which is in excess of the peak value of a normal range of A.C. voltages appearing across said first pair of terminals and less than said minimum unsafe voltage level, and being driven substantially instantaneously into another state wherein said at least portions thereof between the electrodes are in another condition which is of lower resistance and substantially a conductor for conducting the flow of current therethrough in either or both directions when the peak value of the applied voltage thereof is raised above the upper threshold voltage level and the peak value thereof remains above a lower threshold voltage level which is above the peak value of the normal expected voltages across said first pair of terminals, and revert immediately to said blocking condition when the peak value of the applied voltage drops below said lower threshold voltage level, and there being in series with said semiconductor current controlling device a voltage dropping impedance which reduces the voltage across said A.C. measuring device while current flows through said semiconductor current controlling device.

2. In an A.C. circuit including a first pair of terminals across which an A.C. voltage is to be measured, and an A.C. measuring device having a pair of voltage input terminals electrically connected across said first pair of terminals and which is capable of safely handling voltages below a given minimum unsafe voltage level, the improvement comprising overvoltage protection means electrically connected across said voltage input terminals, said overvoltage protection means comprising a symmetrical bi-directional semiconductor current controlling device including semiconductor material means and two load terminals in non-rectifying contact therewith and coupled across said voltage input terminals, said semiconductor material means being of one conducting type and including means for providing a first condition of relatively high resistance for substantially blocking A.C. current therethrough between the load terminals substantially equally in both half cycles of the A.C. current, said semiconductor material means including means responsive to an A.C. voltage of at least an upper threshold value applied to said load terminals for altering said first condition of relatively high resistance of said semiconductor material means for substantially instantaneously providing at least one path through said semiconductor material means between the load terminals having a second condition of relatively low resistance for conducting the A.C. current therethrough substantially equally in each half cycle of the A.C. current, said second low resistance condition lasting each half cycle until the instantaneous current flow therethrough goes below a minimum instantaneous current holding value and resuming the next half cycle when the instantaneous value of the voltage across said load terminals reaches a lower threshold value, said upper and lower threshold values being in excess of the peak value of the normal ranges of A.C. voltages appearing across said first pair of terminals and below the minimum unsafe voltage level, said semiconductor material means including means for maintaining said at least one path of said semiconductor material means in its said second relatively low resistance conducting condition except for its momentary return to said first high resistance condition each half cycle and providing a substantially constant ratio of voltage change to current change for conducting current at a substantially constant voltage therethrough between the load terminals substantially equally in each half cycle of the A.C. current which voltage is the same for increase and decrease in the instantaneous current above said minimum instantaneous current holding value, and providing a voltage drop across said at least one path in its said second relatively low resistance conducting condition which is a minor fraction of the voltage drop across said semiconductor material means in its said first relatively high resistance blocking condition near said upper threshold voltage, and there being in series with said semiconductor current controlling device a voltage dropping impedance which reduces the voltage across said A.C. measuring device while current flows through said semiconductor current controlling device.

3. In an A.C. circuit including a first pair of terminals across which an A.C. voltage is to be measured, and an A.C. measuring device having a pair of voltage input terminals electrically connected across said first pair of terminals and which is capable of safely handling voltages below a given minmium unsafe voltage level, the improvement comprising overvoltage protection means electrically connected across said voltage input terminals, said overvoltage protection means comprising a symmetrical bi-directional semiconductor current controlling device including semiconductor material means and two load terminals in non-rectifying contact therewith and coupled across said voltage input terminals, said semiconductor material means being of one conducting type and including means for providing a first condition of relatively high resistance for substantially blocking A.C. current therethrough between the load terminals substantially equally in both half cycles of the A.C. current, said semiconductor material means including means responsive to an A.C. voltage of at least a threshold value applied to said load terminals for altering said first condition of relatively high resistance of said semiconductor material means for substantially instantaneously providing at least one path through said semiconductor material means between the load terminals having a second condition of relatively low resistance for conducting the A.C. current therethrough substantially equally in each half cycle of the A.C. current, said threshold voltage value being in excess of the peak value of the normal range of A.C. voltages appearing across said first pair of terminals and below said minimum unsafe voltage level, said semiconductor material means including means for maintaining said at least one path of said semiconductor material means in its said second relatively low resistance conducting condition and providing a substantially constant ratio of voltage change to current change for conducting current at a substantially constant voltage therethrough between the load terminals substantially equally in each half cycle of the A.C. current which voltage is the same for increase and decrease in the instantaneous current above a minimum instantaneous current holding value, and providing a voltage drop across said at least one path in its said second relatively low resistance conducting condition which is a minor fraction of the voltage drop across said semiconductor material means in its said first relatively high resistance blocking condition near said threshold voltage value, and said semiconductor material means including means responsive to a decrease in the instantaneous current, through said at least one path in its said relatively low resistance conducting condition, to a value below said minimum instantaneous current holding value in each half cycle of the A.C. current for immediately causing realtering of said second relatively low resistance conducting condition of said at least one path to said first relatively high resistance blocking condition in each half cycle of the A.C. current for substantially blocking the A.C. current therethrough substantially equally in each half cycle of the A.C. current, and there being in series with said semiconductor current controlling device a voltage dropping impedance which reduces the voltage across said A.C. measuring device while current flows through said semiconductor current controlling device.

References Cited
UNITED STATES PATENTS

| | | | |
|---|---|---|---|
| 2,584,800 | 2/1952 | Grisdale | 324—110 |
| 2,976,462 | 3/1961 | Miller | 317—9 |
| 3,048,718 | 8/1962 | Starzec et al. | 307—93 |
| 3,187,224 | 6/1965 | Massena | 317—16 |

JOHN F. COUCH, *Primary Examiner.*

W. E. RAY, *Assistant Examiner.*